(12) United States Patent
VanDalsem et al.

(10) Patent No.: US 9,776,355 B1
(45) Date of Patent: Oct. 3, 2017

(54) EXTRUDER WITH STATIC MIXER INJECTOR

(71) Applicant: Wenger Manufacturing, Inc., Sabetha, KS (US)

(72) Inventors: Scott Eugene VanDalsem, Fairview, KS (US); Brian D. Streit, Laramie, WY (US)

(73) Assignee: Wenger Manufacturing, Inc., Sabetha, KS (US)

( * ) Notice: Subject to any disclaimer, the term of this patent is extended or adjusted under 35 U.S.C. 154(b) by 0 days.

(21) Appl. No.: 15/638,209

(22) Filed: Jun. 29, 2017

Related U.S. Application Data

(63) Continuation of application No. 13/937,573, filed on Jul. 9, 2013, now Pat. No. 9,713,893.

(51) Int. Cl.
*B29C 47/10* (2006.01)
*A23P 30/20* (2016.01)
(Continued)

(52) U.S. Cl.
CPC ........ *B29C 47/1018* (2013.01); *A23N 17/005* (2013.01); *A23N 17/007* (2013.01);
(Continued)

(58) Field of Classification Search
CPC ........... B29B 7/428; B29B 7/488; B29B 7/94; B29B 7/801; B29B 7/7461; B29B 7/60; B29B 7/46; B29B 7/40; B29B 7/88; B29C 47/1063; B29C 47/1018; B29C 47/0004; B29C 2947/92209; B29C 2947/9259; B29C 2947/92504; B29C 47/1072; B29C 47/1081; B29C 47/10; B01F 13/103; B01F 13/1025; B01F 13/1027; B01F 13/1033; B01F 13/1036; B01F 13/1038;
(Continued)

(56) References Cited

U.S. PATENT DOCUMENTS 254,371 A  *  2/1882  Puffer et al. ......... B01J 19/0073
366/142
617,983 A  *  1/1899  Dietrich ................... B01F 7/04
366/325.2
(Continued)

FOREIGN PATENT DOCUMENTS

CA      1201263    *  3/1986
DE      1554773    *  7/1969
(Continued)

*Primary Examiner* — Charles Cooley
(74) *Attorney, Agent, or Firm* — Hovey Williams LLP

(57) ABSTRACT

An extruder (100) for comestible material comprises a tubular barrel (104) and one or more elongated, axially rotatable, helically flighted screws (120, 122) within the barrel (104), where the barrel (104) has a delivery opening (114a). The extruder barrel (104) is equipped with an assembly (22) for delivery of fluid to the interior thereof, including a static mixing section (54) operable to blend steam and water to create a blended mixture; the blended mixture is delivered to the barrel opening (114a) by of a conveying assembly (84, 86) having a pipe assembly (86) with an outlet in communication with the barrel opening (114a); the pipe assembly (86) and opening (114a) have diameters less than maximum internal diameter of the static mixer casing (72).

4 Claims, 6 Drawing Sheets

(51) Int. Cl.
| | |
|---|---|
| *A23N 17/00* | (2006.01) |
| *B29C 47/00* | (2006.01) |
| *B01F 5/06* | (2006.01) |
| *B01F 7/00* | (2006.01) |
| *B01F 15/02* | (2006.01) |
| *B01F 7/02* | (2006.01) |
| *B01F 7/04* | (2006.01) |
| *B01F 13/10* | (2006.01) |
| *B29B 7/72* | (2006.01) |
| *B29B 7/48* | (2006.01) |
| *B29B 7/60* | (2006.01) |
| *B29B 7/74* | (2006.01) |
| *B29B 7/80* | (2006.01) |
| *B29B 7/40* | (2006.01) |
| *B29B 7/46* | (2006.01) |
| *B29B 7/88* | (2006.01) |

(52) U.S. Cl.
CPC ............ *A23P 30/20* (2016.08); *B01F 5/0605* (2013.01); *B01F 5/0615* (2013.01); *B01F 7/00* (2013.01); *B01F 7/022* (2013.01); *B01F 7/042* (2013.01); *B01F 13/103* (2013.01); *B01F 13/1022* (2013.01); *B01F 15/0201* (2013.01); *B29B 7/488* (2013.01); *B29B 7/60* (2013.01); *B29B 7/728* (2013.01); *B29B 7/7461* (2013.01); *B29B 7/801* (2013.01); *B29C 47/0004* (2013.01); *B29C 47/1063* (2013.01); *B29C 47/1072* (2013.01); *B29C 47/1081* (2013.01); *B01F 2005/0637* (2013.01); *B29B 7/40* (2013.01); *B29B 7/46* (2013.01); *B29B 7/88* (2013.01); *B29C 2947/9259* (2013.01); *B29C 2947/92209* (2013.01); *B29C 2947/92504* (2013.01)

(58) Field of Classification Search
CPC ...... B01F 5/0605; B01F 7/00; B01F 15/0201; B01F 5/0615; B01F 7/022; B01F 13/1022; B01F 7/042; B01F 2005/0637; A23P 30/20; A23N 17/005; A23N 17/007
USPC ...... 366/9, 76.1–76.93, 79–90, 158.5, 181.5, 366/182.4, 168.1, 172.1, 172.2, 301, 323, 366/339, 181.6; 425/200–209
See application file for complete search history.

(56) References Cited

U.S. PATENT DOCUMENTS

| | | | | |
|---|---|---|---|---|
| 856,859 A * | 6/1907 | Gentieu | B29B 7/7663 | 366/159.1 |
| 1,293,034 A * | 2/1919 | Chambers | B01F 7/00 | 134/132 |
| 1,565,365 A * | 12/1925 | Hidzick | A22C 25/02 | 366/172.1 |
| 1,626,487 A * | 4/1927 | Warren | B01F 5/0405 | 137/889 |
| 1,683,500 A * | 9/1928 | Thordarson | B01F 3/0807 | 241/189.1 |
| 2,295,942 A * | 9/1942 | Flelds | A01K 47/00 | 264/176.1 |
| 2,626,786 A * | 1/1953 | Mcglothlin | B01F 15/0408 | 137/92 |
| 2,733,051 A * | 1/1956 | Street | B29B 7/007 | 159/2.2 |
| 2,784,948 A * | 3/1957 | Pahl | B01F 5/0451 | 198/657 |
| 2,816,518 A * | 12/1957 | Daggett | A23G 9/282 | 137/896 |
| 2,831,663 A * | 4/1958 | Nauta | B01F 7/302 | 366/287 |
| 2,831,754 A * | 4/1958 | Manka | B01D 11/0473 | 239/404 |
| 3,014,437 A * | 12/1961 | Dutchess | A23G 9/282 | 366/160.1 |
| 3,051,455 A * | 8/1962 | Magester | B01F 5/0656 | 366/159.1 |
| 3,085,288 A * | 4/1963 | Street | B29C 47/38 | 159/2.2 |
| 3,177,886 A * | 4/1965 | Bosman | B01F 5/0403 | 137/251.1 |
| 3,199,147 A * | 8/1965 | Aykanian | B29C 44/3442 | 425/326.1 |
| 3,305,894 A * | 2/1967 | Pfaff | B01F 7/081 | 159/2.2 |
| 3,337,194 A * | 8/1967 | Zavasnik | B01F 5/246 | 366/181.5 |
| 3,360,824 A * | 1/1968 | Schippers | B29C 47/585 | 137/109 |
| 3,410,938 A * | 11/1968 | Schippers | B28B 3/22 | 159/2.2 |
| 3,461,498 A * | 8/1969 | Ramaika | B29C 47/1063 | 264/211 |
| 3,575,382 A * | 4/1971 | Loomans | B29B 7/482 | 366/301 |
| 3,608,868 A * | 9/1971 | Koch | B29B 7/483 | 366/82 |
| 3,631,883 A * | 1/1972 | Guenther | B29C 47/1063 | 137/317 |
| 3,638,921 A * | 2/1972 | Bredeson | B29C 47/1063 | 100/150 |
| 3,656,716 A * | 4/1972 | Ljungerg | C06B 21/00 | 366/150.1 |
| 3,684,252 A * | 8/1972 | Nissle | B29C 47/762 | 159/2.2 |
| 3,728,055 A * | 4/1973 | Bredeson | B29C 47/1063 | 425/202 |
| 3,773,098 A * | 11/1973 | Rock | C22C 1/08 | 164/133 |
| 3,776,702 A * | 12/1973 | Chant | B01F 5/0256 | 261/76 |
| 3,794,300 A * | 2/1974 | Harder | B01F 5/0656 | 366/339 |
| 3,814,563 A * | 6/1974 | Slaby | B29C 47/1063 | 100/117 |
| 3,879,021 A * | 4/1975 | Riley | B01F 5/205 | 366/137.1 |
| 3,916,825 A * | 11/1975 | Schnitzler | B27N 1/0245 | 118/303 |
| 3,917,507 A * | 11/1975 | Skidmore | B29C 47/362 | 159/2.2 |
| 3,963,558 A * | 6/1976 | Skidmore | B01D 1/00 | 159/2.2 |
| 3,991,153 A * | 11/1976 | Klausner | B29C 47/38 | 264/182 |
| 3,993,292 A * | 11/1976 | Skidmore | B29C 47/1063 | 159/2.2 |
| 4,053,141 A * | 10/1977 | Gussefeld | B01F 5/0656 | 366/339 |
| 4,055,673 A * | 10/1977 | Mueller | A01K 5/002 | 366/152.1 |
| 4,093,188 A * | 6/1978 | Horner | B01F 3/10 | 366/336 |
| 4,110,843 A * | 8/1978 | Skidmore | B29C 47/76 | 264/211.23 |
| 4,114,195 A * | 9/1978 | Dirksing | A47L 15/4427 | 134/199 |
| 4,125,208 A * | 11/1978 | Bettermann | B29C 47/76 | 222/152 |
| 4,126,398 A * | 11/1978 | Phillips | B01F 7/022 | 366/168.1 |
| 4,128,052 A * | 12/1978 | Mueller | A23B 9/00 | 366/168.1 |
| 4,131,368 A * | 12/1978 | Iddon | B29C 47/60 | 366/318 |
| 4,133,485 A * | 1/1979 | Bouvin | B01F 5/0614 | 138/42 |

(56) References Cited

U.S. PATENT DOCUMENTS

| | | | | |
|---|---|---|---|---|
| 4,136,251 A * | 1/1979 | Bice | ................ | B29C 47/76 159/2.2 |
| 4,155,657 A * | 5/1979 | King | ................ | B01F 3/0807 366/160.1 |
| 4,159,181 A * | 6/1979 | Perrine | ................ | B01F 7/00125 366/171.1 |
| 4,162,128 A * | 7/1979 | Ogden | ................ | B01F 3/04453 261/DIG. 26 |
| RE30,378 E * | 8/1980 | Bice | ................ | C08C 1/14 159/2.2 |
| 4,363,671 A * | 12/1982 | Rugg | ................ | B01J 3/042 127/1 |
| 4,390,285 A * | 6/1983 | Durr | ................ | B01F 7/022 366/102 |
| 4,393,017 A * | 7/1983 | Kim | ................ | B29C 44/3446 239/551 |
| 4,423,960 A * | 1/1984 | Anders | ................ | B29C 47/38 366/75 |
| 4,461,579 A * | 7/1984 | McCallum | ................ | B01F 5/0617 366/337 |
| 4,527,902 A * | 7/1985 | Christen | ................ | B27N 1/0245 366/147 |
| 4,600,311 A * | 7/1986 | Mourrier | ................ | B29C 47/0822 366/322 |
| 4,611,921 A * | 9/1986 | Patel | ................ | B01F 15/0298 198/533 |
| 4,643,584 A * | 2/1987 | Allocca | ................ | B01F 5/0617 165/135 |
| 4,728,476 A * | 3/1988 | Boring | ................ | B29C 45/0013 264/328.18 |
| 4,752,139 A * | 6/1988 | Hauck | ................ | B01F 7/042 366/185 |
| 4,755,061 A * | 7/1988 | Goins | ................ | B01F 5/24 193/27 |
| 4,775,239 A * | 10/1988 | Martinek | ................ | B01F 7/042 366/172.2 |
| 4,832,497 A * | 5/1989 | Wentzel | ................ | E01C 19/1022 366/2 |
| 4,839,193 A * | 6/1989 | Mange | ................ | A23G 3/0205 426/448 |
| 4,850,705 A * | 7/1989 | Horner | ................ | B01F 5/0615 366/338 |
| 4,900,156 A * | 2/1990 | Bauer | ................ | B29C 47/6093 366/322 |
| 4,902,418 A * | 2/1990 | Ziegler | ................ | B01D 29/39 210/321.77 |
| 4,937,034 A * | 6/1990 | Sewell | ................ | B29C 47/1063 264/211.21 |
| 4,987,850 A * | 1/1991 | McCracken | ................ | B02B 1/06 118/303 |
| 5,100,239 A * | 3/1992 | Ono | ................ | B28C 5/468 366/108 |
| 5,161,888 A * | 11/1992 | Hauck | ................ | B01F 7/042 366/299 |
| 5,232,280 A * | 8/1993 | Moriyama | ................ | B29C 47/0801 366/83 |
| 5,283,021 A * | 2/1994 | Shih | ................ | B29C 47/763 159/3 |
| 5,318,358 A * | 6/1994 | Wobbe | ................ | B29B 7/489 366/319 |
| 5,375,925 A * | 12/1994 | Elkin | ................ | B28C 5/4282 366/156.2 |
| 5,393,213 A * | 2/1995 | Murata | ................ | B29C 47/0825 366/83 |
| 5,460,448 A * | 10/1995 | Woolsey | ................ | B01F 7/042 366/149 |
| 5,480,597 A * | 1/1996 | Ishida | ................ | B01F 15/0429 261/DIG. 26 |
| 5,486,366 A * | 1/1996 | Song | ................ | A23G 4/00 264/211 |
| 5,499,870 A * | 3/1996 | Rockstedt | ................ | B29C 47/0825 366/300 |
| 5,603,565 A * | 2/1997 | Kohlgruber | ................ | B29B 7/489 366/85 |
| 5,653,534 A * | 8/1997 | Matsumoto | ................ | B29C 45/1816 366/76.1 |
| 5,694,833 A * | 12/1997 | Wenger | ................ | B29B 7/42 366/82 |
| 5,700,510 A * | 12/1997 | Hauck | ................ | A23P 30/20 264/211.21 |
| 5,811,038 A * | 9/1998 | Mitchell | ................ | B29C 47/369 264/209.6 |
| 5,887,974 A * | 3/1999 | Pozniak | ................ | B01F 3/088 366/136 |
| 5,951,159 A * | 9/1999 | Schobert-Csongor | ................ | B29B 7/12 366/156.2 |
| 5,981,237 A * | 11/1999 | Meagher | ................ | C08B 30/12 435/151 |
| 5,992,464 A * | 11/1999 | Cowell | ................ | B01F 3/028 137/888 |
| 6,022,133 A * | 2/2000 | Herring | ................ | B29C 47/0825 366/85 |
| 6,062,719 A * | 5/2000 | Busby | ................ | B29C 47/0825 366/85 |
| 6,129,010 A * | 10/2000 | Hurd | ................ | A23P 30/20 99/349 |
| 6,164,813 A * | 12/2000 | Wang | ................ | B01F 3/0853 366/339 |
| 6,182,685 B1 * | 2/2001 | Goff | ................ | B29C 47/1063 137/240 |
| 6,247,839 B1 * | 6/2001 | Kochanowicz | ................ | B01F 5/0405 251/315.16 |
| 6,250,795 B1 * | 6/2001 | Kochanowicz | ................ | B01F 5/0405 366/159.1 |
| 6,328,798 B1 * | 12/2001 | Bostrom | ................ | B01F 7/022 118/24 |
| 6,382,826 B1 * | 5/2002 | Della Rossa | ................ | B29C 47/0801 366/100 |
| 6,427,724 B2 * | 8/2002 | Hua | ................ | F04F 5/24 137/888 |
| 6,472,615 B1 * | 10/2002 | Carlson | ................ | G01G 13/024 177/105 |
| 6,482,453 B2 * | 11/2002 | Wenger | ................ | B29C 47/10 366/141 |
| 6,551,401 B1 * | 4/2003 | Winistorfer | ................ | B01F 7/00641 118/19 |
| 6,609,819 B2 * | 8/2003 | Hauck | ................ | B29C 47/0014 366/323 |
| 6,637,926 B1 * | 10/2003 | Auad | ................ | B01F 7/00383 366/168.1 |
| 6,648,501 B2 * | 11/2003 | Huber | ................ | A22C 5/00 366/301 |
| 6,676,395 B2 * | 1/2004 | Bandera | ................ | B29C 44/3415 425/133.5 |
| 6,698,917 B2 * | 3/2004 | Etchells, III | ................ | B01F 3/10 366/336 |
| 6,793,964 B2 * | 9/2004 | Hoad | ................ | C08K 9/08 366/336 |
| 6,911,607 B2 * | 6/2005 | Klijn | ................ | B01F 5/26 177/116 |
| 7,270,470 B1 * | 9/2007 | Johnson | ................ | B01F 15/0201 366/183.1 |
| 7,322,738 B2 * | 1/2008 | Yamane | ................ | B29C 47/38 366/75 |
| 7,387,432 B2 * | 6/2008 | Lu | ................ | B01F 5/0615 222/145.6 |
| 7,448,795 B2 * | 11/2008 | Wenger | ................ | B01F 7/042 318/5 |
| 7,566,165 B2 * | 7/2009 | Radford | ................ | B01F 5/0475 366/173.1 |
| 7,588,789 B1 * | 9/2009 | Kearns | ................ | A23N 17/005 426/446 |
| 7,611,347 B1 * | 11/2009 | Kearns | ................ | A23N 17/005 425/205 |
| 7,794,134 B1 * | 9/2010 | Henry | ................ | A23N 17/005 366/138 |
| 7,883,263 B1 * | 2/2011 | Wenger | ................ | A23N 17/005 366/172.2 |

(56) References Cited

U.S. PATENT DOCUMENTS

| | | | |
|---|---|---|---|
| 7,963,214 B1* | 6/2011 | Wenger | A23K 40/20 366/144 |
| 7,987,774 B2* | 8/2011 | Wenger | A23N 17/005 426/445 |
| 8,177,414 B1* | 5/2012 | Wenger | B01F 7/001 366/155.1 |
| 8,246,240 B2* | 8/2012 | Wenger | B29B 7/481 366/133 |
| 8,277,866 B2* | 10/2012 | Plattner | A23P 30/20 426/449 |
| 8,322,272 B1* | 12/2012 | Wenger | B01F 7/001 366/156.2 |
| 8,360,631 B2* | 1/2013 | Melnyczuk | B01F 5/0451 366/337 |
| 8,393,780 B2* | 3/2013 | Wenger | A23N 17/005 366/301 |
| 8,827,539 B2* | 9/2014 | Wenger | A23N 17/005 366/85 |
| 8,858,065 B1* | 10/2014 | VanDalsem | B29C 47/1018 366/158.5 |
| 8,967,849 B2* | 3/2015 | VanDalsem | B29C 47/1018 366/158.5 |
| 9,028,133 B2* | 5/2015 | Wenger | B01F 7/081 366/301 |
| 2003/0071028 A1* | 4/2003 | Boehnke | B22D 17/007 219/388 |
| 2003/0134036 A1* | 7/2003 | Hoad | C08K 9/08 427/212 |
| 2003/0231544 A1* | 12/2003 | Tedman | B01F 5/0473 366/76.3 |
| 2004/0156808 A1* | 8/2004 | Kazuhiko | B01F 3/0807 424/70.12 |
| 2006/0103045 A1* | 5/2006 | O'Brien-Bernini | B29C 47/0004 264/45.9 |
| 2006/0231645 A1* | 10/2006 | Chan | B01F 5/0453 239/424 |
| 2007/0115753 A1* | 5/2007 | Landers | B01F 3/1228 366/76.91 |
| 2007/0253281 A1* | 11/2007 | Radford | B01F 5/0475 366/173.1 |
| 2008/0080303 A1* | 4/2008 | Kojima | B01F 3/04517 366/160.1 |
| 2008/0094939 A1* | 4/2008 | Wenger | B01F 7/042 366/301 |
| 2008/0095910 A1* | 4/2008 | Wenger | B01F 7/042 426/557 |
| 2008/0223223 A1* | 9/2008 | Wenger | A23N 17/005 99/447 |
| 2009/0067282 A1* | 3/2009 | Wenger | B01F 7/042 366/300 |
| 2009/0073800 A1* | 3/2009 | Tarmann | B01F 5/0451 366/153.1 |
| 2009/0175119 A1* | 7/2009 | Wenger | B29B 7/481 366/132 |
| 2010/0062093 A1* | 3/2010 | Wenger | A23N 17/005 425/113 |
| 2010/0226198 A1* | 9/2010 | Kapila | B01F 3/0865 366/158.5 |
| 2010/0260882 A1* | 10/2010 | Kearns | A23N 17/005 425/209 |
| 2011/0086150 A1* | 4/2011 | Plattner | A21C 11/20 426/549 |
| 2011/0086151 A1* | 4/2011 | Plattner | A23P 30/20 426/550 |
| 2012/0021085 A1* | 1/2012 | Lovranich | B29B 13/065 425/376.1 |
| 2012/0052174 A1* | 3/2012 | Wenger | A23N 17/005 426/510 |
| 2012/0092952 A1* | 4/2012 | Wenger | A23N 17/005 366/301 |
| 2012/0171346 A1* | 7/2012 | Plattner | A23P 30/20 426/549 |
| 2015/0016210 A1* | 1/2015 | VanDalsem | B29C 47/1018 366/168.1 |
| 2015/0016211 A1* | 1/2015 | VanDalsem | B29C 47/1018 366/182.4 |
| 2015/0017273 A1* | 1/2015 | VanDalsem | B29C 47/1018 425/200 |
| 2015/0020695 A1* | 1/2015 | Wenger | B01F 7/081 99/348 |
| 2015/0023742 A1* | 1/2015 | Schmalholz | B29B 7/66 406/49 |
| 2017/0043519 A1* | 2/2017 | Streit | B29C 47/0014 |

FOREIGN PATENT DOCUMENTS

| | | | | |
|---|---|---|---|---|
| DE | 2008104 | * | 9/1970 | |
| DE | 1778166 | * | 7/1971 | |
| DE | 102007050681 A1 | * | 4/2009 | |
| DE | 102010039025 A1 | * | 2/2012 | B29C 45/1816 |
| EP | 0033220 A2 | * | 8/1981 | |
| FR | 940947 | * | 12/1948 | |
| FR | 1003469 A | * | 3/1952 | B29C 47/1063 |
| GB | 828361 A | * | 2/1960 | B29C 47/50 |
| WO | 2004/094122 A1 | * | 11/2004 | |
| WO | WO 2008102290 A1 | * | 8/2008 | B01J 19/20 |
| WO | WO 2009052898 A1 | * | 4/2009 | B29C 44/3415 |
| WO | WO 2012016715 A3 | * | 4/2012 | B29C 45/1816 |

* cited by examiner

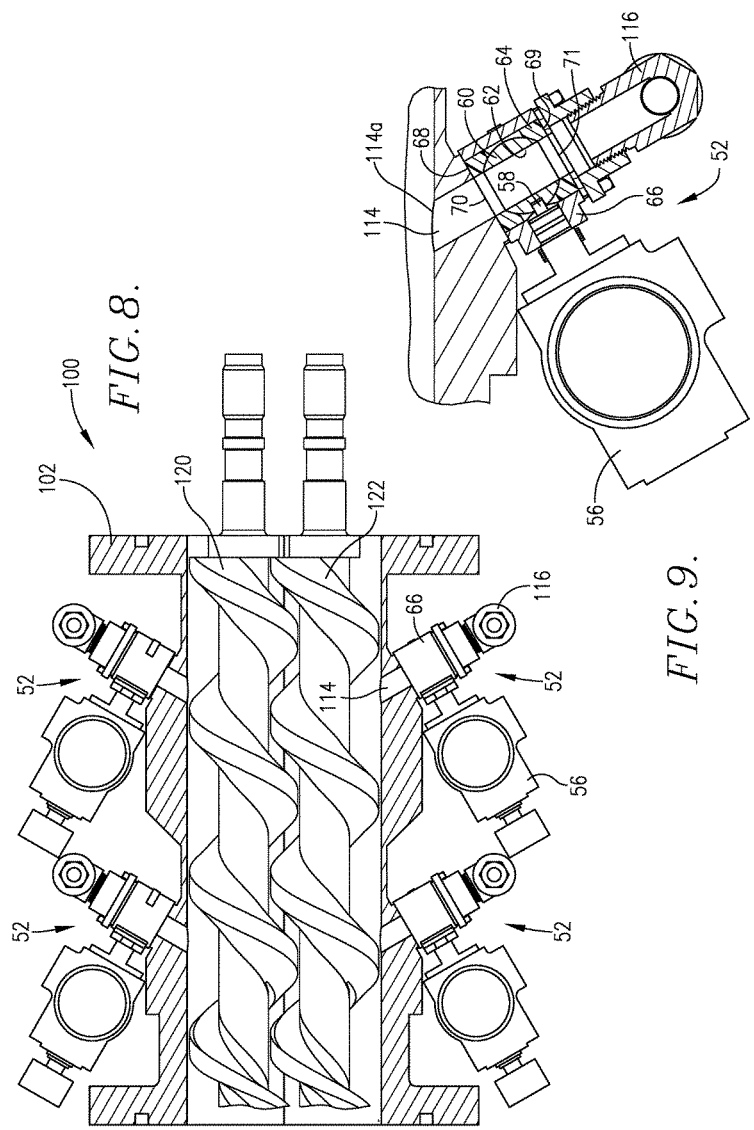

EXTRUDER WITH STATIC MIXER INJECTOR

CROSS-REFERENCE TO RELATED APPLICATION

This application is a continuation of application Ser. No. 13/937,573 filed Jul. 9, 2013, and incorporated herein in its entirety.

BACKGROUND OF THE INVENTION

Field of the Invention

The present invention is broadly concerned with improved apparatus for the injection of plural fluids into extrusion system processing components, such as preconditioners and extruders. More particularly, the invention is concerned with such apparatus, alone or in combination with extrusion system processing components, which include injector valves, preferably with interconnected static mixer sections, to efficiently inject steam/water mixtures (and other optional fluids, if desired) using greatly simplified equipment.

Description of the Prior Art

Extrusion cooking systems have long been used for the processing of various types of comestible products, such as human foods or animal feed. Such systems have a number of different components, but the principal processing components are an upstream product preconditioner coupled to a downstream extruder. In the preconditioner, initially dry ingredients are typically mixed with water and/or steam and oil in order to moisturize and partially pre-cook the ingredients. The preconditioned products are then fed into the extruder where the materials are subjected to increasing levels of temperature, pressure, and shear, and are extruded from restricted orifice die structure. In some instances, additional steam and/or water is injected into the extruder barrel during processing, as an extrusion aid and to facilitate complete cooking and forming of final products.

Conventional preconditioners generally include an elongated vessel or housing having one or two elongated, axially rotatable shafts therein having outwardly extending mixing elements or beaters thereon. As the ingredients are advanced toward the outlet of the housing, moisture in the form of steam or water is injected at separate locations along the housing length. Consequently, these preconditioners are equipped with corresponding manifolds with injectors leading to the interior of the housing. Moreover, delivery hoses are usually secured to the manifolds for delivery of moisture. This complicated apparatus can be difficult to service and clean, and requires sophisticated manual operator control to assure proper moisturization at the different injection locations. For example, U.S. Pat. No. 7,906,166 illustrates multiple-injector moisturization apparatus secured to a preconditioner housing. In other cases, additional such assemblies are used for injection along virtually the entire length of the preconditioner housing.

These conventional preconditioners tend to generate and vent a significant quantity of steam during use thereof. This is a serious problem for processors, owing to the fact that this escaping hot steam can readily mix with food particulates, creating a contamination problem as the materials coat the extrusion system components and the adjacent environment. This contamination is aesthetically unpleasant, and can create serious microbiological contamination problems as well. Moreover, the evolution of excess steam is a very inefficient waste of thermal energy.

The injectors used with typical preconditioners are of relatively small diameter, usually on the order of one-half-five-eighths inch, and can have relatively long lengths of over 6 inches. As such, it is quite common for the injectors to become partially or completely plugged during operation of the preconditioners, requiring down time and maintenance/cleanup.

Many of these problems are duplicated where extruders are equipped with conventional injectors, although not usually to the same extent as preconditioners. Nonetheless, it can be difficult to control and continuously operate an extruder where injection/contamination issues are faced.

There is accordingly a need in the art for improved injection apparatus which can be used with preconditioners and/or extruders in order to more efficiently inject plural fluids, while minimizing the plugging and contamination problems endemic with conventional extrusion systems, while optimizing the use of thermal energy.

SUMMARY OF THE INVENTION

The present invention overcomes the problems outlined above and provides improved apparatus for injection of fluids into extrusion system processing components, such as a preconditioner housing and/or an extruder barrel. The preferred apparatus comprises a fluid static mixer section including an elongated, tubular casing having a plurality of fluid inlets, a stationary mixing assembly within the casing and operable to mix plural fluids, and an outlet for delivering mixed fluids from the static mixer. The preferred apparatus further comprises an injector valve including a fluid inlet operably coupled with the static mixer outlet, a mixed fluid outlet, shiftable control valve structure, and an actuator operably coupled with the valve structure for selective shifting thereof. The overall apparatus has structure for permitting coupling of the valve fluid outlet to an extrusion system component selected from the group consisting of a preconditioner housing and an extruder barrel.

The composite static mixer/injector valve apparatus can be used with a preconditioner and/or an extruder for injection of fluids. In the case of a preconditioner, only a single composite apparatus is normally required, and in the case of an extruder, plural apparatus can be used adjacent the inlet end of the extruder barrel.

Although the composite apparatus is preferred, the invention is not so limited. That is, a preconditioner may be provided including fluid injection apparatus made up of an injector valve alone permitting selective injection of fluid into the preconditioner housing; the injector valve includes a fluid inlet, a fluid outlet, and shiftable valve structure for selective fluid flow control from the valve inlet to the valve outlet.

In order to minimize or eliminate plugging of the fluid injection apparatus, the axial distance between the valve outlet and the inner surface of the preconditioner housing should be less than about 3 inches, advantageously less than about 1 inch, and most preferably less than about one-half inch. Similarly, the diameter of the fluid-conveying structure of the injection apparatus should be relatively large, preferably at least about 1 inch. The combination of the large diameter fluid conveying-structure together with the short valve injection distance assures essentially plug-free operation of the preconditioner.

These same considerations apply in the context of fluid injection apparatus for extruders, i.e., the fluid-conveying components and the injection path lengths should be designed using the same diameter/length parameters recited above in the case of preconditioners.

While composite fluid injector valve/static mixer section injection apparatus is preferred, improvements can be realized using these components separately, i.e., a preconditioner or extruder may be equipped only with the injector valves of the invention, or conversely use can be made of static mixer sections without the need for injector valves.

The invention is primarily concerned with steam and/or water injection into extrusion components. However, other ingredients or additives can be injected separately or along with moisture, such as fats, colorants, emulsifiers, and the like.

BRIEF DESCRIPTION OF THE DRAWINGS

FIG. 8 is a sectional view of a barrel section of the twin screw extruder, and illustrating four of the valve injectors of the invention mounted on a barrel section of the extruder;

FIG. 9 is an enlarged, fragmentary, sectional view of one of the valve injectors depicted in FIG. 8, and illustrating further details of the valve injector.

DETAILED DESCRIPTION OF THE PREFERRED EMBODIMENT

Turning now to FIGS. 1-4, a preconditioner 20 is illustrated, equipped with a composite fluid injection assembly 22 mounted thereon for delivery of mixed fluids, such as steam and water, to the interior of the preconditioner. The preconditioner is of the type described in U.S. Pat. No. 7,906,166, which is fully and completely incorporated by reference herein.

Broadly, the preconditioner 20 includes an elongated mixing housing 24 with a pair of parallel, elongated, axially-extending, rotatable mixing shafts 26 and 28 within and extending along the length thereof. The shafts 26, 28 are operably coupled with individual, digitally controlled, variable speed/direction drive devices (not shown). The preconditioner 20 is adapted for use with a downstream processing device such as an extruder or pellet mill, and is used to moisturize and partially cook comestible materials, such as human foods or animal feeds.

Figure 1:
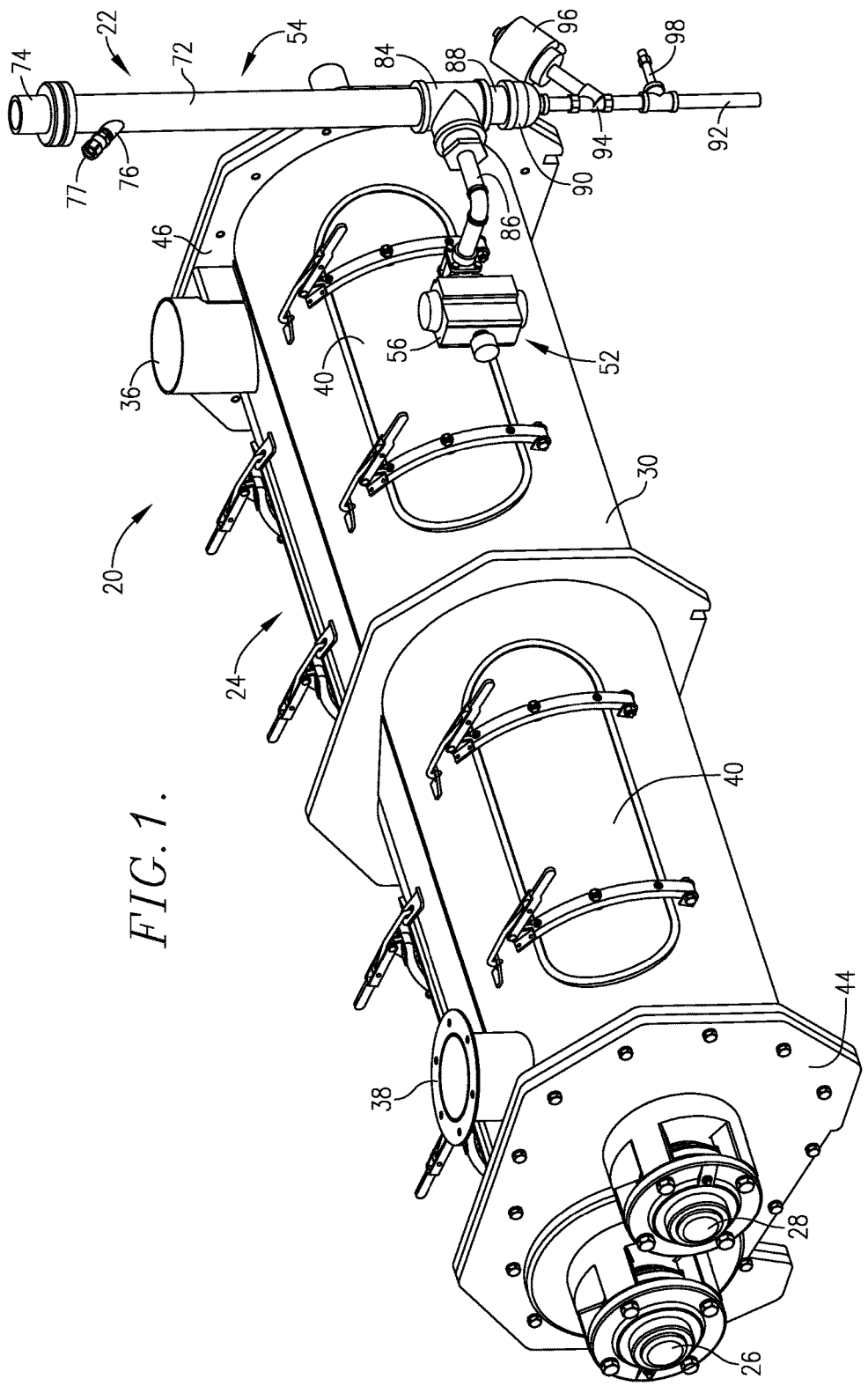
FIG. 1 is a perspective view of a preconditioner in accordance with the invention, equipped with an improved fluid injection assembly including a fluid valve injector and a static mixing section.
Figure 2:
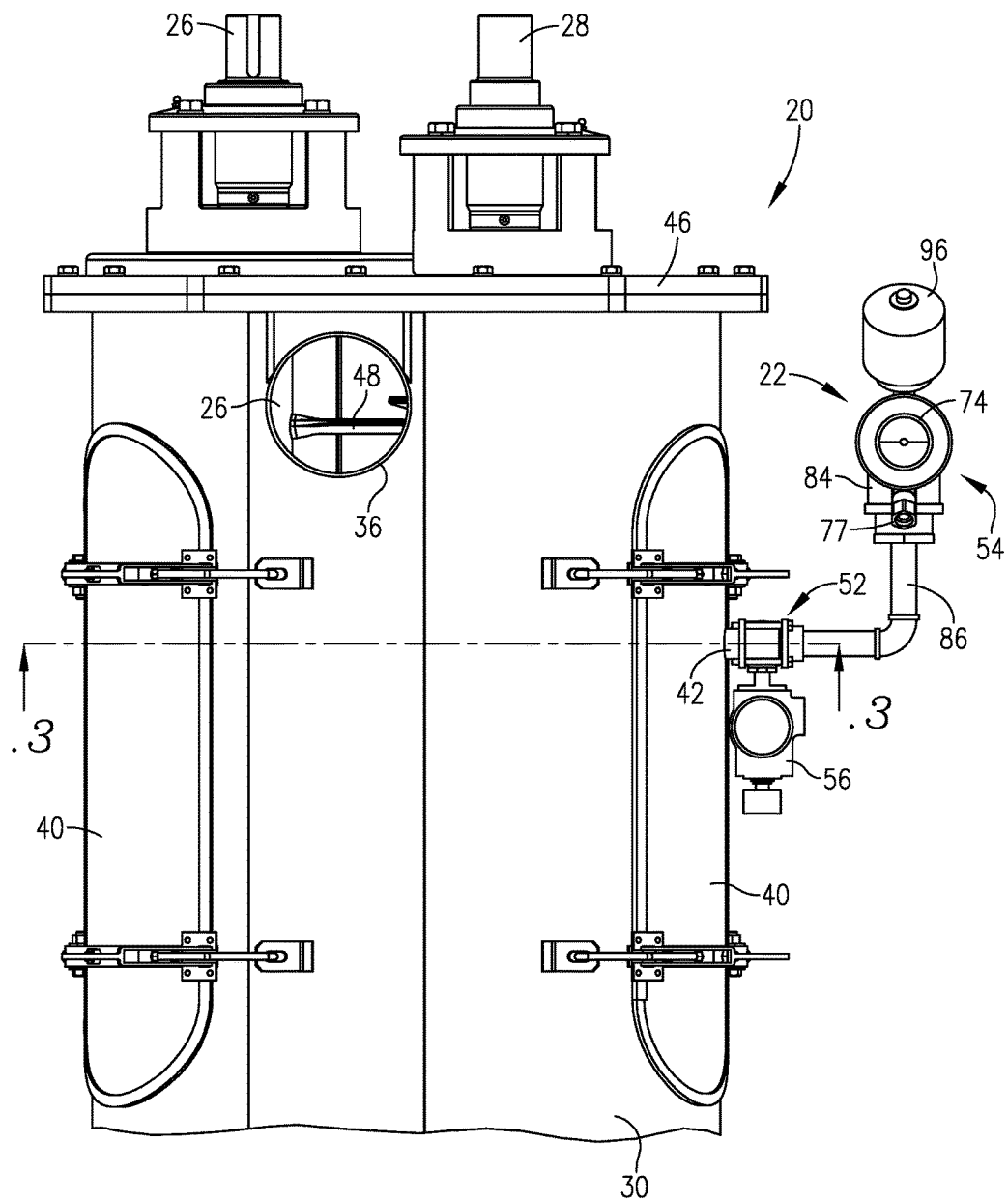
FIG. 2 is a fragmentary top view of the preconditioner illustrated in FIG. 1.
Figure 4:
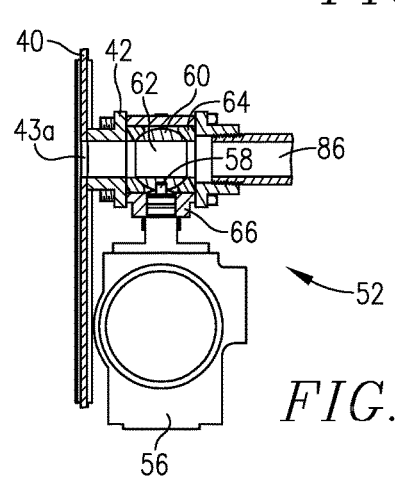
FIG. 4 is a perspective view of the access door of the preconditioner of FIG. 1, including a mounting bracket for the valve injector of the fluid injection assembly.
Figure 4A:
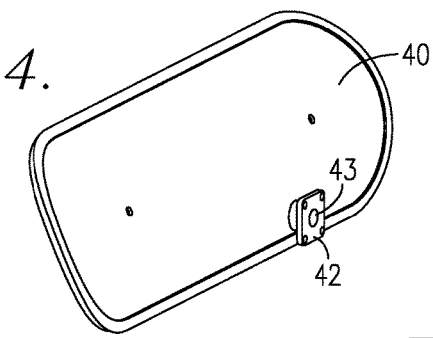
FIG. 4A is an enlarged, fragmentary view illustrating a fluid injection valve assembly mounted on the door bracket of FIG. 4.
Figure 3:
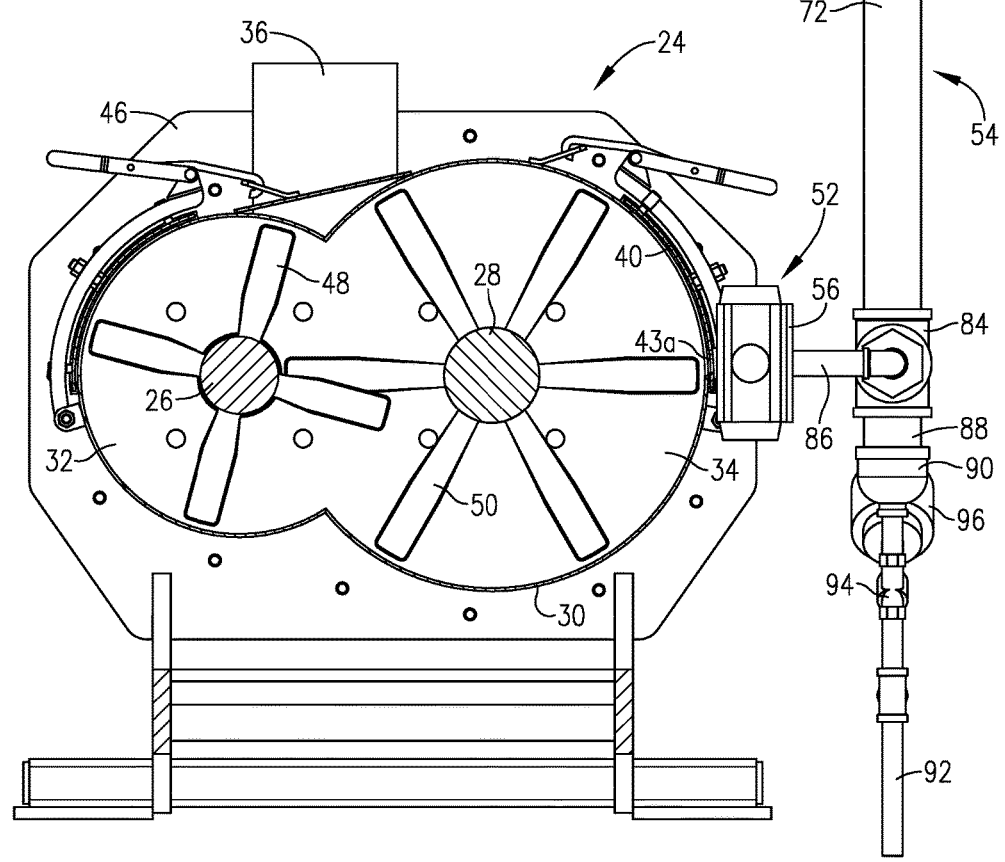
FIG. 3 is a vertical sectional view taken along the line 3-3 of FIG. 2.

In more detail, the housing 24 has an elongated, transversely arcuate sidewall 30 presenting a pair of elongated, juxtaposed, intercommunicated chambers 32 and 34, as well as a material inlet 36, a lower material outlet (not shown), and a vapor vent 38. The chamber 34 has a larger cross-sectional area than the adjacent chamber 32, as will be readily apparent from a consideration of FIG. 3. The sidewall 30 has four, hingedly mounted access doors 40, and the assembly 22 is secured to the rearmost access door 40 communicating with chamber 34. This access door 40 is equipped with a mounting plate 42 having an injection aperture 43 which extends through the door and presents an innermost injection opening 43a (FIG. 4A). Of course, mounting plate 42 or other similar hardware can be affixed to other portions of the sidewall 30, at the discretion of the designer. The opposed ends of housing 24 are equipped with end plates 44 and 46, as shown.

Each of the shafts 26, 28 has a plurality of outwardly-extending mixing elements 48 and 50 thereon which are designed to agitate and mix material fed to the preconditioner, and to convey the material from inlet 36 towards and through the lower outlet. The elements 48 are axially offset relative to the elements 50, and the elements 48, 50 are intercalated (i.e., the elements 50 extend into the cylindrical operational envelope presented by shaft 26 and elements 48, and vice versa). Although the elements 48, 50 are illustrated as being substantially perpendicular to the shafts 26, 28, the invention is not so limited; moreover, the elements 48, 50 are adjustable in both length and pitch, at the discretion of the user. It will be seen that the shaft 26 is located substantially along the centerline of chamber 32, and that shaft 28 is likewise located substantially along the centerline of the chamber 34.

The composite fluid injection assembly 22 of this embodiment broadly includes a fluid injection valve assembly 52 and a static mixing section 54, and is designed to inject a plurality of mixed fluids into preconditioner 20, such as steam/water or steam/water/additives. As explained in greater detail below, the assembly 22 simplifies the equipment required for fluid injection, is more sanitary, increases the energy efficiency of the preconditioner, and results in higher levels of moisture and/or cook in the preconditioned products, as compared with conventional fluid injection equipment.

The injection valve assembly 52 (FIG. 4A) includes a selectively actuatable valve body 56 having an internal mechanical drive (not shown) with an outwardly extending, axially rotatable stem 58. The stem 58 is connected to a spherical valve ball 60 having a central passageway 62. The ball 60 is located within a tubular segment 64, which is received within an outer valve sleeve 66. The inboard end of sleeve 66 is secured to mounting plate 42 by means of threaded fasteners. It will be observed that the central passageway 62 and the bore of segment 64 are of equal diameter, and that the opposed inboard and outboard faces 68, 69 of the segment 64 respectively define the fluid outlet 70 and fluid inlet 71 of the valve assembly 52. In preferred practice, the valve assembly 52 is an automated valve, which can be controlled as a part of an overall digital control system for the preconditioner 20. However, other types of valves may be used in this context.

The static mixing section 54 includes an upright tubular casing 72 having a maximum internal diameter (FIG. 5), with an uppermost tubular steam inlet 74 and an oblique water inlet 76, preferably equipped with an atomizer 77. A static mixer 78 is situated within casing 72 and includes an elongated, stationary central shaft 15 80 with a plurality of generally helical, outwardly extending plates 82 secured to the shaft 80. The function of mixer 78 is to intensely mix incoming streams of steam and water, and any other desired additives, for delivery to injection valve assembly 52. To this end, a pipe tee 84 is secured to the bottom end of casing 72, and the transverse leg thereof is operatively coupled to the inlet 71 of valve assembly 52 by means of conventional piping 86.

The lower end of tee 84 is equipped with a pipe section 88, reducer 90, and condensate outlet pipe 92. The pipe 92 has an intermediate valve 94, which is controlled by solenoid 96. A resistance temperature probe 98 is operatively coupled with pipe 92 below valve 94, and serves to measure the steam condensate temperature and monitor the presence of live steam prior to start-up of he system; once the temperature reaches 100 degrees C., the valve 94 closes and the system can start. Of course, the probe 98 and solenoid 96 are connected to the overall digital control system for the preconditioner 20 for automated control of valve 94.

An important aspect of the invention is the geometry of the injection valve assembly 52 and the injection aperture 43. In order to substantially reduce or even eliminate the possibility of plugging of the valve assembly 52, the diameters of the injection aperture 43, injection opening 43*a*, valve ball passage 62, the bore of segment 64, the valve inlet 71, and the valve outlet 70 should all be at least about 1 inch, and more preferably from about 1-2 inches, and are advantageously all the same diameter. Furthermore, the axial distance between the fluid outlet 70 and the injection outlet opening 43*a* should be held to a minimum. This distance should be no more than about 3 inches, preferably less than about 2 inches, still more preferably less than about 1 inch, and most preferably less than about one-half inch.

During the normal operation of preconditioner 20, dry ingredients are fed to the inlet 36 during rotation of the shafts 26, 28. Simultaneously, appropriate quantities of steam and/or water are directed through the inlets 74, 76 and are thoroughly blended in casing 72 during passage through static mixing section 54. This blended mixture is passed into the injection valve assembly 52 through tee 84 and piping 86, whereupon it is injected into the interior of housing 24 through injection inlet 43*a* for mixing with the dry ingredients. During this sequence, the valve 94 is closed. When the temperature probe 98 detects the buildup of condensate above valve 94, the latter is opened to allow collected condensate to drain from the system via pipe 92.

The injection of the blended mixture into housing 24 comprises the step of conveying the blended mixture from the static mixer 78 to the injection inlet 43*a* using a conveying assembly including pipe 86, valve ball 60, central passageway 62, and mounting plate 42. As depicted in FIG. 4A, the passageway of plate 42 defines the outlet of the conveying assembly, which is adjacent to and in communication with the injection inlet 43*a*, where the internal diameters of the plate 42 passageway and the injection inlet 43*a* are less than the maximum internal diameter of the casing 72. By virtue of this arrangement, it will be appreciated that there is no contact between the blended mixture and the atmosphere during the mixture-injecting step.

It will also be observed that the longitudinal axis of the pipe 86 is transverse to the longitudinal axis of the casing 72 (FIGS. 1-4A) or at an acute angle to a longitudinal axis of extruder barrel 104 (FIGS. 7-10). In the illustrated embodiment, the longitudinal axis of the casing 72 is upright whereas the longitudinal axis of the pipe 86 is horizontal.

Although the composite fluid injection assembly 22 has been illustrated and described in connection with a preconditioner, this assembly can also be used in the context of single or twin screw extruders. Furthermore, improved fluid injection results can be obtained when using the individual components of the assembly 22. Hence, either preconditioners or extruders may be equipped with fluid injection valve assemblies 52 or the static mixing sections 54 to achieve improved results. It is preferred, however, to employ the composite injection assembly 22.

Figure 7:
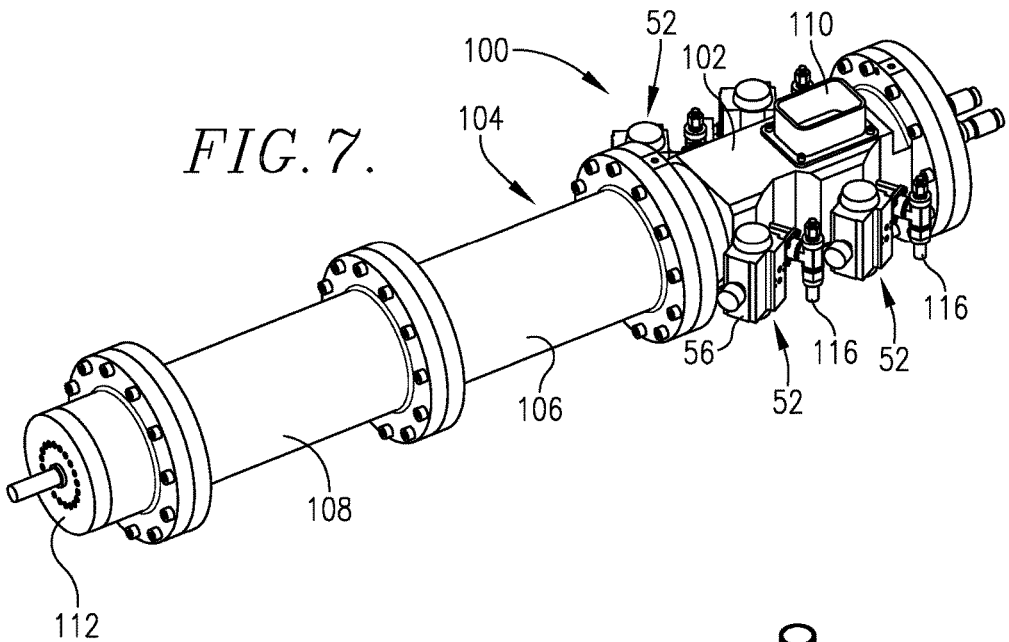
FIG. 7 is a perspective view of a twin screw extruder having four fluid injection assemblies mounted on the extruder barrel, with the assemblies comprising fluid valve injectors, without the use of static mixing sections.

For example, FIG. 7 illustrates a twin screw extruder 100 equipped with four fluid injection valve assemblies 52 secured to the inlet head 102 of the extruder. The extruder 100 is itself of conventional design and includes an elongated, tubular, multiple head extruder barrel 104 made up of inlet head 102, intermediate head 106, and terminal head 108. As illustrated, the inlet head 102 is equipped with a material inlet 110 adjacent the input end of the barrel 104, whereas a restricted orifice die assembly 112 is provided at the outlet end of the barrel. Internally, the extruder 100 has a pair of elongated, axially rotatable, multiple-section extruder screws each having a central shaft with outwardly extended helical fighting thereon (see FIG. 9). Material delivered to inlet 110 is subjected to increasing levels of temperature, pressure, and shear during passage through the extruder and such material is ultimately extruded through assembly 112

Figure 10:
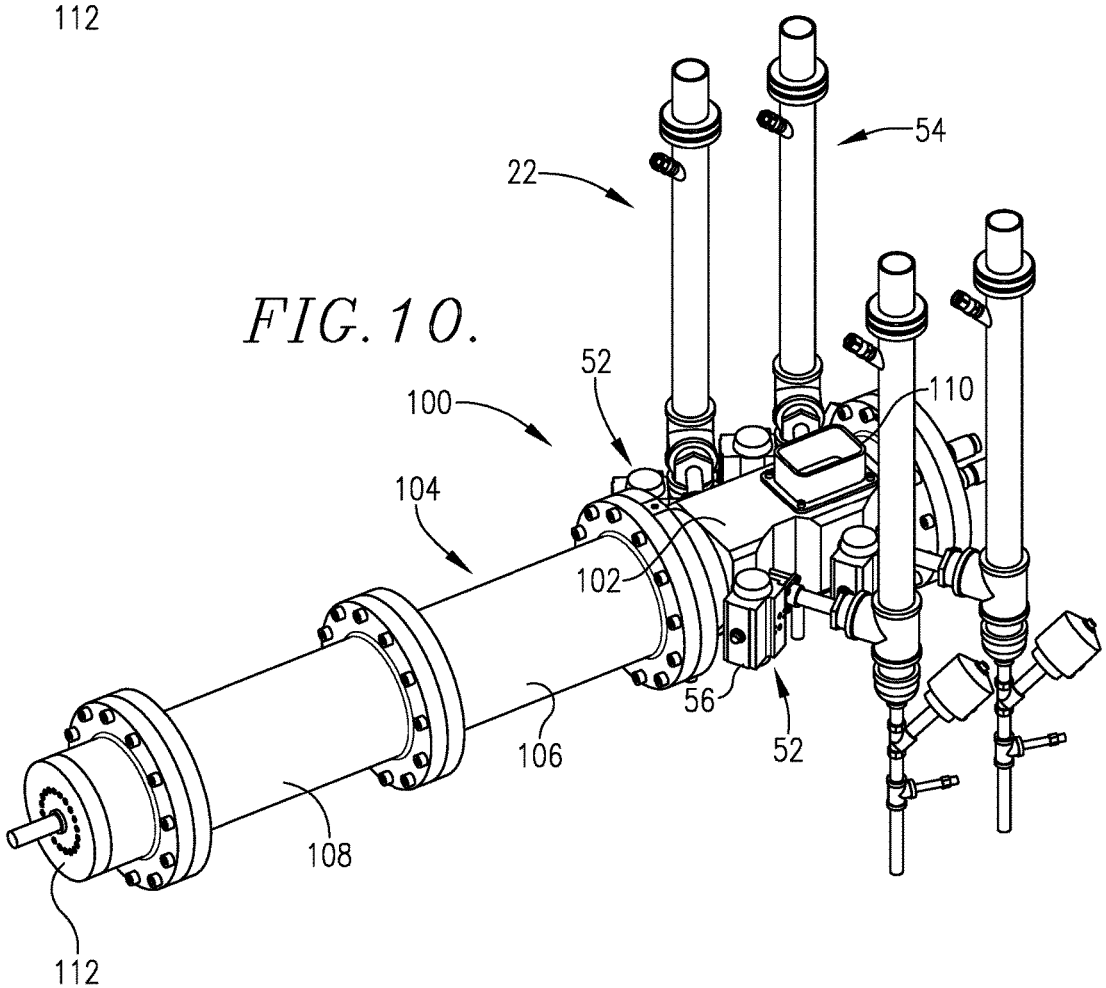
FIG. 10 is a view similar to that of FIG. 7, but illustrating fluid injection assemblies including both fluid valve injectors and static mixing sections.

During the course of extrusion of many types of comestible materials, it is important that steam and/or water, with or without additional ingredients, be injected into the barrel where it is thoroughly mixed with the previously preconditioned ingredients during the extrusion cooking process. In the embodiment of FIG. 7, four of the injection valve assemblies 52 are secured to inlet head 102 at respective locations where injection bores 114 are formed through the sidewall of the head 102, terminating in openings 114*a*. A water and/or steam line 116 is secured to the input of each valve assembly 52, in lieu of the piping 86. FIG. 10 illustrates the extruder 100, but in this case equipped with the previously described complete fluid injection assemblies 22 mounted on the head 102. FIG. 9 further illustrates the internals of the twin screw extruder 100, including the previously mentioned pair of extruder screw assemblies, labeled as 120, 122, situated within an extruder barrel. Another option would be to have only a single static mixer section 54 plumbed for connection with the four injection valves 52 illustrated in FIG. 10.

In the foregoing extruder embodiments, the fluid injection assemblies have each included the fluid injection valve assemblies 52. In these embodiments, the same geometrical considerations apply as in the case of the preconditioner embodiments. Specifically, in order to avoid plugging, the diameters of the passageway 62 and bore 117 should both be at least about ½ inch, and more preferably from about 1-2 inches, and are preferably of the same diameter. The axial distance between the fluid outlet 70 and the opening 114*a* should be no more than about 3 inches, preferably less than about 2 inches, still more preferably less than about 1 inch, and most preferably less than about one-half inch.

Figures 5, 6:
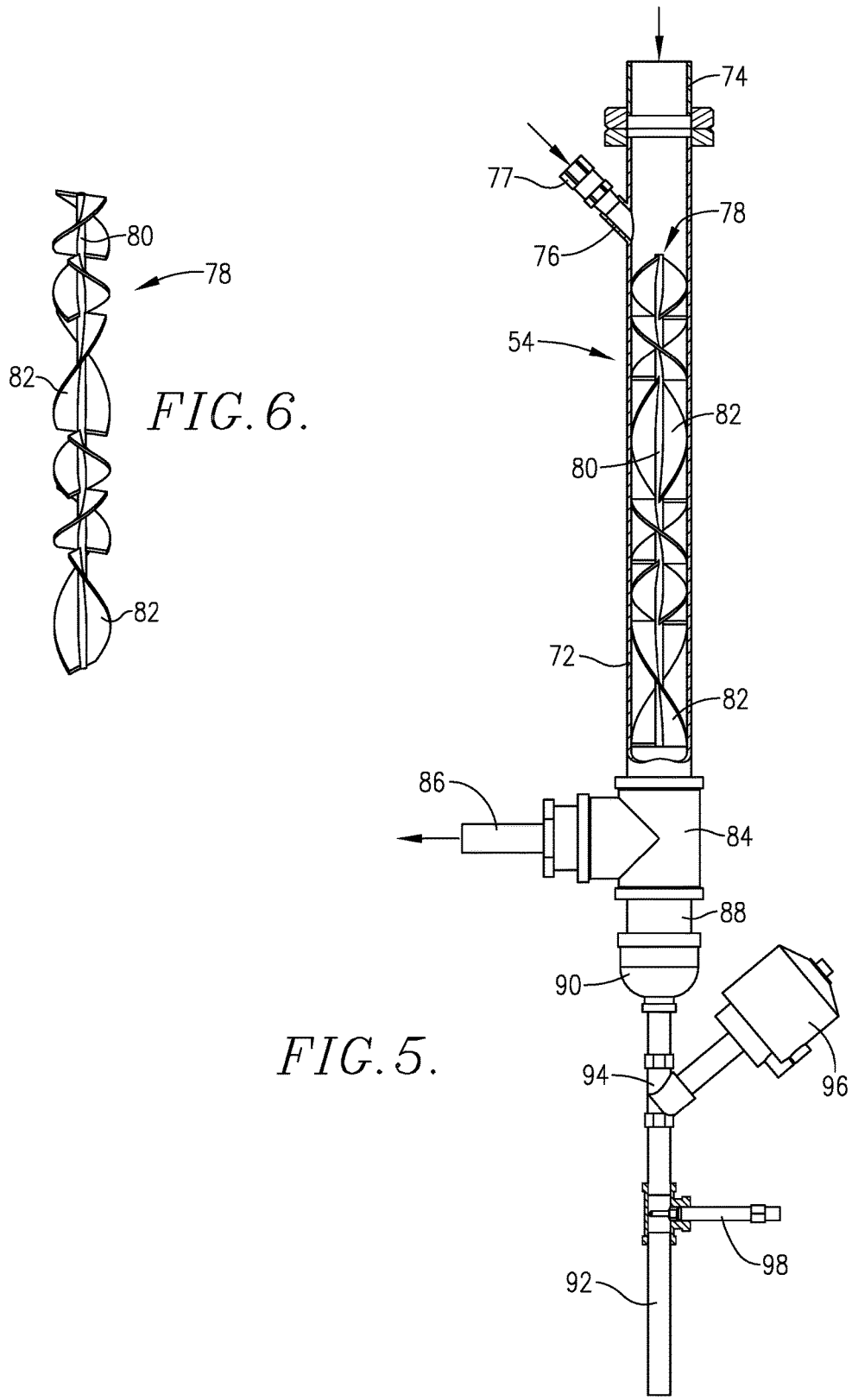
FIG. 5 is a side view of a fluid injection assembly comprising an upright static mixing section, but without the use of a fluid valve injector.
FIG. 6 is a side elevational view of the internal mixing element forming a part of the static mixer section.

In other cases, use may be made of an injection assembly without an injector valve. As illustrated in FIG. 5, a fluid injection assembly may include the previously described static mixing section 54, with tee 84 and related piping which is directly secured to a preconditioner and/or extruder barrel, as the case may be.

The use of composite fluid injection assembly 22 with preconditioner 20 results in a number of important advantages not obtainable with prior fluid injection apparatus, typically making use of a plurality of injectors and associated manifolds, piping, and hoses. For example, the preferred composite fluid injection apparatus gives at least the following improvements:

Static Mixer—mixes/blends steam and water (and optional additional ingredients), delivering superheated water to the conditioning cylinder.
  No mechanical mixing.
  No Venturi mixing.
Water Injector to Static Mixer—Atomizes water to provide more surface area to condense steam in the static mixer.
Automated Control Valve—Automated open/close valve that is closely mounted to the body of the conditioning cylinder allows for the efficient delivery of steam/water to the process, and is mounted in a manner to minimize the distance between the valve and the cylinder body to reduce injector plugging potential.
Condensate Resistance Temperature Detector—Determines the buildup of condensate.
Condensate Solenoid Valve—Upon detection of condensate, the solenoid valve opens to drain the condensate.
System Controls—Controls are tied into the overall extrusion system control software, such as the Wenger APM System, for the automated control of the valve and condensate temperature detector.

The principal advantages of the fluid injection assemblies include:

Reduces the number of steam and water injection ports from typically 5-6 for steam and water injectors (10-12 total) to one.
  Simplifies control of system for operators and troubleshooting for maintenance.
    Reduces operator influence on system, allowing better automated control.
    Improves operation and product quality consistency.
  Eliminates the need for multiple steam and water manifolds.
    Improves sanitary design of the conditioning cylinder by reducing the number of obstructions to clean around.
  Reduces the number of valves, hoses, and injectors that have to be maintained and replaced.
Location of the fluid injector valve on the preconditioner housing or extruder barrel greatly reduces the potential for injector plugging:
  Increases equipment up time.
  Improves process control.
  Improves product consistency and quality.
Significant reduction in discharge steam vapor discharged from the system.
  Increase steam and water consumption on a per unit basis.
  Reduces the food safety and sanitation risk from steam vapor and associated fine food particulate matter going into the atmosphere and potentially contaminating equipment and environment.
Utilizes a static mixer to combine the process team and water:
  Increases temperature of water to allow for better absorption into the product.
  Reduces steam vapor that can blow through the produce and not be absorbed.
Higher product temperatures from the preconditioner
  Improved adsorption of the steam and water inputs result in higher product temperatures.
  Achieves control point temperatures at lower steam and water inputs.
Higher starch gelatinization (cook) values
  Higher cook values during preconditioning provide opportunity for higher final product cook values from extruder.

As indicated, use of the fluid injection apparatus is particularly important in the case of preconditioning of food or feed materials prior to extrusion thereof. In order to demonstrate the superiority of the present invention versus conventional fluid injection apparatus, a series of test runs were carried out using the improved preconditioner of the invention equipped with the composite assembly 22 of the invention, versus an otherwise identical preconditioner having the normal multiple steam/water injectors along the length of the preconditioner housing. In all cases, the individual comparative tests involved the same feed recipes (pet or aquatic feeds) with the same thermal energy inputs, retention times, and the like.

The test results confirm that the preferred apparatus of the invention consistently yields higher cook values (as measured by the extent of starch gelatinization) at a variety of preconditioner mixing intensities and feed rates. These improvements, coupled with the reduction in steam vapor venting from the apparatus of the invention and consequent better energy utilization, are salient features of the invention.

These test results are summarized in the following Table.

We claim:

1. An extruder for processing comestible material, comprising:
   an elongated, tubular barrel having a comestible material inlet and a restricted orifice die outlet, said barrel having an opening therethrough in communication with the interior of the barrel;
   at least one elongated, axially rotatable, helically flighted screw within said barrel and operable to move comestible material within said barrel from said inlet toward and through said restricted orifice die outlet, said comestible material thereby being subjected to increasing levels of temperature, pressure, and shear; and
   apparatus for delivery of fluid into said barrel, comprising—
     a static mixer including a casing having separate steam and water inlets for respectively receiving individual quantities of steam and water, said casing presenting a maximum internal diameter, there being a mixing assembly within said casing operable to blend the separate quantities of steam and water from said inlets and to produce a blended mixture, and a blended mixture outlet; and
     a conveying assembly including a pipe assembly operably coupled with said blended mixture outlet and having a pipe assembly outlet adjacent to and in communication with said barrel opening, said pipe assembly outlet and said barrel opening having diameters less than the maximum internal diameter of said static mixer casing.

2. The extruder of claim 1, the conveying assembly including valve structure comprising a shiftable valve member.

3. The extruder of claim 2, said valve member being a rotatable ball valve.

4. The extruder of claim 1, said water inlet including an atomizer.

\* \* \* \* \*